(12) United States Patent
Weinstein et al.

(10) Patent No.: US 6,394,712 B1
(45) Date of Patent: May 28, 2002

(54) FIXTURE FOR CLAMPING WORK PIECES FOR DRILLING AND MAKING POCKET HOLE JOINTS

(75) Inventors: Burton Weinstein, City Island; Richard H. Deaton, New York, both of NY (US)

(73) Assignee: Simp'l Products, INC, City Island, NY (US)

( * ) Notice: Subject to any disclaimer, the term of this patent is extended or adjusted under 35 U.S.C. 154(b) by 0 days.

(21) Appl. No.: 09/811,300

(22) Filed: Mar. 15, 2001

(51) Int. Cl.[7] .............................................. B23B 49/00
(52) U.S. Cl. .................................... 408/103; 408/115 R
(58) Field of Search ........................ 408/97, 103, 115 R

(56) References Cited

U.S. PATENT DOCUMENTS

| | | | | |
|---|---|---|---|---|
| 2,824,470 A | * | 2/1958 | Groves ........................ 408/103 |
| 4,243,083 A | * | 1/1981 | Serrano ....................... 408/103 |
| 4,842,453 A | * | 6/1989 | Raines et al. ............ 408/115 R |
| 4,955,766 A | * | 9/1990 | Sommerfeld ................. 408/103 |
| 5,676,500 A | * | 10/1997 | Sommerfeld ................. 408/103 |
| 5,791,835 A | * | 8/1998 | Chiang et al. ............... 408/103 |
| 6,254,320 B1 | * | 7/2001 | Weinstein et al. ........... 408/103 |

* cited by examiner

*Primary Examiner*—Daniel W. Howell

(57) ABSTRACT

A fixture for joining two work pieces by pocket hole joints has a base to be mounted to or movable along a table or other member and a drill guide having one or more angled drill guide channels is mounted to the base to be movable toward and away from the table top on which the work pieces are placed. In one embodiment a toggle type clamp on the base carries the drill guide. In another embodiment the base has an upper arm above the work pieces and the drill guide is mounted on the end of a screw that is threaded into the upper arm. The drill guide is moved by the toggle clamp or screw against the work pieces to hold them clamped to the table and a drill bit is advanced in each angled guide channel into the work pieces to form a pocket joint. A screw is driven through a guide channel into the previously drilled pocket hole to join the work pieces.

15 Claims, 3 Drawing Sheets

FIXTURE FOR CLAMPING WORK PIECES FOR DRILLING AND MAKING POCKET HOLE JOINTS

FIELD OF THE INVENTION

The invention relates to a fixture for drilling holes for and for making pocket hole joints in work pieces that are to be joined together.

BACKGROUND OF THE INVENTION

A pocket hole joint is one that is used to join two work pieces, usually of wood, together by the use of a screw that is recessed. This type of joint is frequently used in making face frames, such as shown in FIG. 4, In which a rail R is to be joined to a stile S, with the two pieces being at a 90 degree angle to each other. As seen, a pair of angled pocket holes P are formed in one of the pieces, here shown as the rail, and a screw is driven though it into the other piece. The screws are recessed in the pocket holes and are not exposed.

The use of fixtures for location and guidance of a drill bit to drill a holes in a workpiece for a pocket hole joint is well known. U.S. Pat. No. 4,955,766 discloses the combination of a drill bit with a stop collar and a fixture used for making holes for a pocket hole joint in a workpiece. The fixture has an L-shaped base with the inner face of one leg of the base serving as a guide portion for the workpiece. The other base leg has a portion to hold a clamping device, shown as an over-center clamp, to hold the workpiece against the guide portion leg. An angled channel having a stop flange at its upper end is provided on the guide portion leg. The drill bit is inserted into the channel and drills a hole at an angle in the workpiece up to the point where the stop collar engages the flange. The fixture of this patent has no provision for holding together the two work pieces that are to be joined while the pocket holes are drilled.

U.S. patent application Ser. No. 09/517,253, filed Mar. 2, 2000, now U.S. Pat. No. 6,254,320, granted Jul. 3, 2001, which is assigned to the assignee of the subject application discloses a fixture having a U-shaped base for drilling holes for pocket hole joints. In this fixture one face of the workpiece is held by a screw clamp against the interior surface of a leg of the base having an angled guide channel that accepts a drill bit that is threaded on the opposing leg of the U-shaped base. An edge of the workpiece rests on the center, or support, leg having a channel into which the tip end of the drill bit can enter, with the channel being viewable from either end of the base. This fixture also is not capable of the drilling of the pocket holes with the two work pieces to be joined being held together.

A need exits for a fixture that can be used to hold the two work pieces together in the position in which they are to be joined while the angled pocket holes are being drilled and the screws are driven to fasten the pieces together.

BRIEF DESCRIPTION OF THE INVENTION

The present invention relates to an improved and different form of a relatively simple fixture for making pocket hole joint holes in one workpiece while the other workpiece that is to be joined to it is held in the proper position for joining. In accordance with a preferred embodiment of the invention, a base for a toggle type clamp is fastened to a surface such as the end edge of a work table. A pocket hole drill guide member is mounted on a swivel at the end of the toggle clamp operating arm. The pocket hole drill guide has an angled guide channel for a drill bit with an exit opening.

A first workpiece, such as the stile of a face frame, is laid on the work table with one edge against a guide edge at the clamp base and the second workpiece, the frame rail, is butted at 90 degrees to the first piece. Actuation of the toggle clamp brings the pocket hole drill guide onto the top surfaces of both pieces to clamp them to the table. A drill bit is advanced in the guide channel of the drill guide to drill an angled pocket hole in the second piece and the drilled hole can extend into the first piece. The drill is removed from the drill channel and a screw is inserted in an driven through the guide channel to screw the second and first pieces together. The clamp is then released and the two joined pieces are removed from the table.

The pocket hole drill guide is preferably horizontally adjustable relative to the surfaces of the pieces that it engages to provide for selection of the position at which the pocket holes are to be drilled to accommodate work pieces of different widths. The drill guide also is preferably vertically adjustable to assure a firm placement of the pocket hole guide against the pieces being joined to clamp the to the table. This feature accommodates work pieces of different thicknesses. The fixture base can be permanently fastened to the work table, such as by using screws, or can be temporarily mounted, such as by use of a screw clamp. It also can be mounted on a rail so that it can be positioned along the length of the table.

In another embodiment of the invention the fixture has a clamp bar that extends vertically transverse to the work table. A lower clamp arm is mounted on the clamp bar that is to engage the lower surface of the work table. The first workpiece is placed on the table top surface aligned against the vertical clamp bar and the second piece is butted to it at 90 degrees. An upper clamp arm is mounted on the upper end of the clamp bar and the end of this arm extends above and over the two pieces on the work table. A pocket hole drill guide is mounted on a screw that is threaded into the upper clamp arm.

To operate the fixture of this embodiment, the clamp vertical bar serves as a guide for one edge of the first workpiece. The threaded clamp is screwed down until the pocket hole drill guide engages and is securely clamped to the top surfaces of the two work pieces. This holds and properly positions the pocket hole drill guide relative to the piece into which the pocket hole is to be drilled. Here also, the screw is driven through the guide channel of the drill guide into the angled pocket hole of the second piece and into the first piece.

In both of the embodiments the pocket hole drill guide can accept a conventional stepped drill bit or other suitable bit in the guide channel. The fixtures are relatively simple in construction and efficient in operation and permit precise drilling of pocket joint holes in one workpiece while another to which it is to be joined is held in clamped relationship so that the screw can be driven.

OBJECTS OF THE INVENTION

It is an object of the present invention to provide a novel fixture for drilling holes for pocket hole joints in one workpiece while another workpiece to which it is to be joined is held clamped to it.

A further object is to provide a fixture for clamping two work pieces to be joined to a table and for forming the holes for pocket hole joints in one workpiece and that permits the two pieces to be connected together by screws while they are still clamped to the table.

Another object is to provide a fixture for joining two work pieces by pocket hole joints in which a toggle clamp mounted on a base carries a pocket hole drill guide that engages and holds two work pieces together when the toggle clamp is actuated to permit drilling of angled pocket holes and driving screws to join the pieces.

Yet another object is to provide a fixture for joining two work pieces by pocket hole joints with the fixture being formed by a clamp bar that is to be located vertically transverse to the top surface of a work table on which the work pieces are placed, a lower clamp arm mounted on the bar to engage the lower surface of the worktable and a pocket hole guide mounted on movable member on a clamp arm at the upper end of the bar that is vertically adjustable to engage and clamp the work pieces to the table while the pocket holes are drilled.

A further object is to provide a fixture for drilling holes for pocket hole joints in which a pocket hole drill guide is moved into position from above the two work pieces on a table that are to be joined to clamp and hold them to the table while the pocket holes are drilled and the screws for joining the pieces are driven.

BRIEF DESCRIPTION OF THE DRAWINGS

Other objects and advantages of the present invention will become more apparent upon reference to the following specification and annexed drawings in which.

DETAILED DESCRIPTION OF THE INVENTION

Figure 1A:
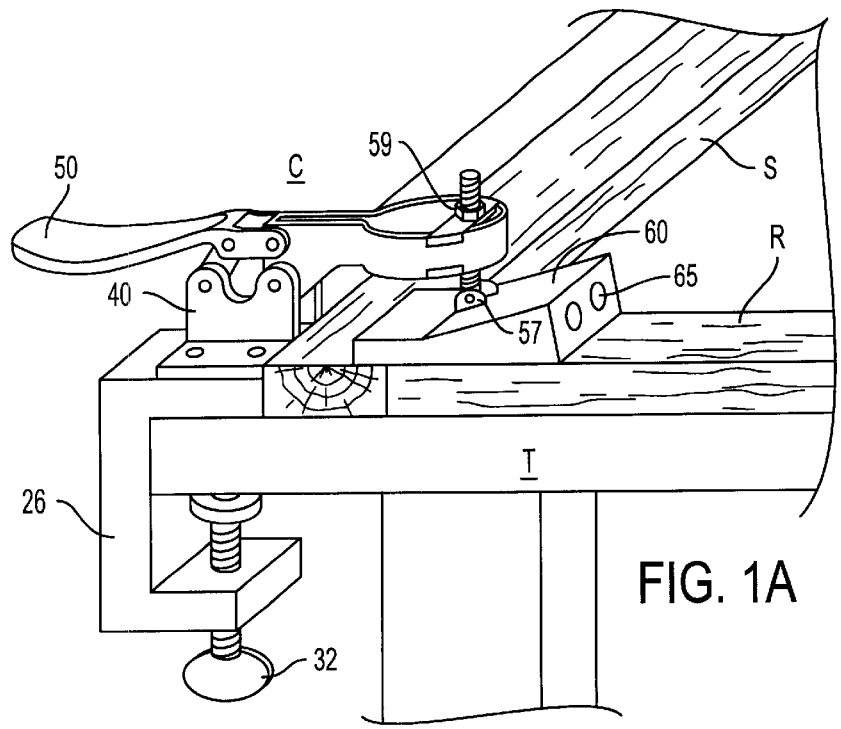
FIG. 1A is a perspective top and side view of the fixture in accordance with a first embodiment of the invention and FIG. 1B is a side elevational view.
Figure 1B:
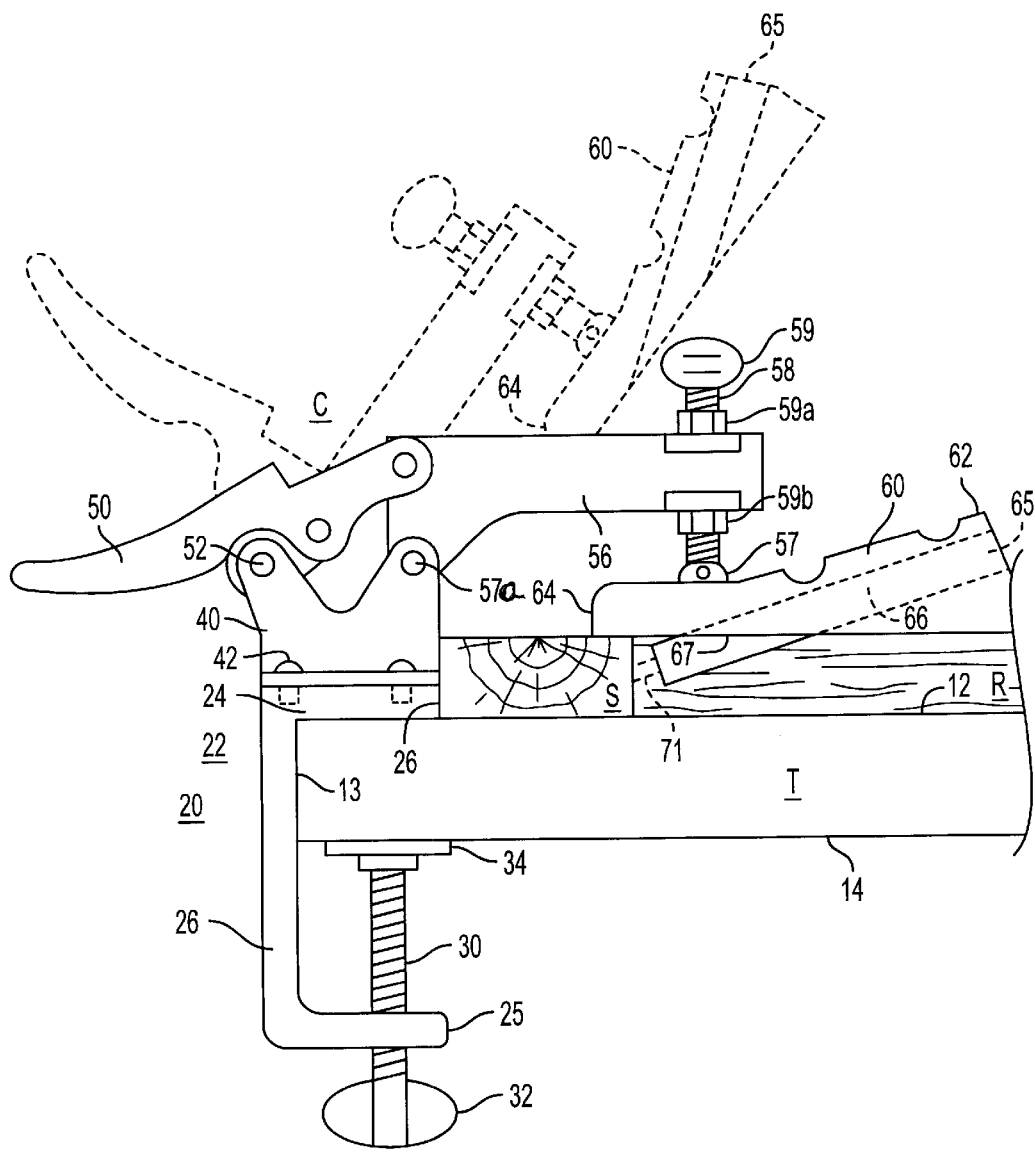
Figure 4:
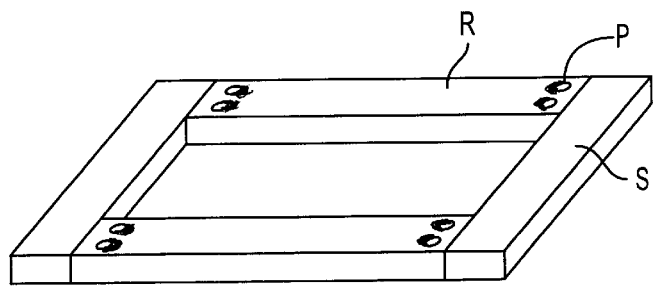
FIG. 4 is a perspective view of a face frame.

Referring to FIGS. 1A and 1B, a work table is designated by T to which the fixture 20 is to be mounted. The table has an upper surface 12, a front end edge 13 and a lower surface 14. Two work pieces that are to be joined together by pocket joints are shown on the table top. The first piece S, such as the stile of a face frame, is generally parallel to the table front edge 13 and the second, the rail R, is butted to it at 90 degrees. While the invention is described with reference to a table on which the fixture is to be mounted, it should be understood that it can be mounted to any member having a flat surface on which the work pieces can be placed. Also, the table does not have to be horizontal as shown in FIGS. 1A and 1B. For example, the table T could be vertical or at any intermediate position, by mounting it on an angularly adjustable support.

A fixture 20 has a U-shaped base 22 with an upper arm 24 whose lower surface rests on the top 12 of the table T. The base 22 also has a lower arm 24 and the upper and lower arms 22, 24 are connected by a vertical center arm 26. A screw threaded clamp 30 is threaded through the base lower arm 24 and has a thumb piece 32 for rotating the screw and a clamp pad 34 that engages the lower surface 14 of the table T. By rotating the threaded screw 30, the base 22 can be clamped to the table 12. As described below, the inner edge 26 of the clamp upper arm 24 serves as an alignment guide for the workpiece S. The dimensions of the base 22 can be selected as desired. For example, the arms 23, 24, 26 can be about three–four inches long relative to the table front edge 26 and the height of the center arm 26 can be about 3–5 inches. The width of the base arms can be about 3–4 inches. Any other suitable dimensions can be selected as needed.

The base 40 of a conventional toggle, or over-center, clamp C is fastened to the top of the upper arm 24 of the clamp base 22 such as by rivets or screws 42, or by any other suitable fastening means. As an alternative, the bottom of the clamp base 40 can form the upper arm of the base 22 such as by welding it to the upper end of the base center arm 26. The size of the bottom wall of toggle clamp base 40 preferably is of the same width and length as the top arm 24 of clamp base 22. If there is a separate clamp base 40, it is preferred that the inner edge of the toggle clamp base 40 be made flush with the inner edge 26 of the base upper arm 24 so that it also can serve as an aligning edge for the workpiece S. If desired, the length of the upper arm 24 or base 40 bottom wall can be extended in length in a direction along the table to provide a larger aligning surface for the workpiece S.

The toggle clamp C is of conventional construction and has an actuating lever 50 that is pivotally mounted at joints 52 to the toggle clamp base 40. The toggle clamp also has an upper operating arm 56 that is pivotally mounted to the base 40 at joints 57a. As is conventional with such toggle clamps, when the lever 50 is pushed downward, the operating arm 56 is moved downward and locked by the clamp toggle action. Conversely, when the lever 50 is moved upward, the lock is disengaged and the operating arm 56 is moved upward. The latter condition is shown by the dotted line position of the clamp in FIG. 1B.

A pocket hole drill guide 60 is mounted to the end of the toggle clamp operating arm 56 by an adjustable screw threaded mechanism 58 in a slot 59 at the end of the operating arm 56. There is a swivel joint 57 between the end of the screw and the drill guide. The adjustment mechanism 58 is held to the arm by nuts 59a and 59b and has a thumb screw 59 at its upper end which permits vertical adjustment. By turning the thumb screw 59, the vertical position of the pocket hole drill guide 60 can be vertically adjusted relative to the table top 12. The position of the guide 60 is adjustable relative to the length of operating arm 56 by the loosening the nuts 59a and 59b, sliding mechanism 58 along the slot 59 and then tightening the nuts.

The length of the drill guide 60 parallel to the table front edge 13 can be, for example, from 3–5 inches and the width about 5–7 inches. Again, any suitable dimensions can be selected.

The pocket hole drill guide 60 has an outer side 62 and an inner side 64. The surface of the drill guide bottom wall is preferably flat. Two spaced angled guide channels 66 are formed in the drill guide 60. Each channel has an entry 65 in the drill guide outer side 62 and an exit 67 in the drill guide bottom wall at a point intermediate the guide sides 62 and 64. As seen in FIG. 1A, the exit point is at the workpiece R. While two guide channels 66 are shown there can be only a single channel or even three or more. Each angled guide channel 66 accepts a drill bit from a drill (not shown) whose tip end 71 is shown having passed at an angle through the piece R and extending into the edge of the workpiece S to make a screw pilot hole.

In operation of the fixture 20 of FIG. 1, it is first affixed to the table T, if this has not already been done, by adjusting the screw clamp 30 of the base 22. For greater stability, it is preferred that the inner surface of the base vertical arm 26 be flat so that it can be abutted against the table end edge 13. This also properly positions the guide edge 26 of the base upper arm 24 to be generally parallel to the table end edge 13. The toggle clamp actuator lever 50 is operated to place the clamp in the open position, as shown by the dotted lines in FIG. 1B. The workpiece S is placed on the table top 12 and its edge aligned against the base clamp upper arm guide edge 26 and toggle clamp base 40. The second workpiece R is butted at 90 degrees to piece S positioned where the joining of the pieces is to take place.

The actuator lever 50 of the toggle clamp is then moved downward to its locked condition. If necessary, depending on the size and thickness of the work pieces, the vertical and longitudinal positions of the pocket hole drill guide 60 can be adjusted by operating the screw threaded mechanism 58. Proper positioning of the drill guide 60 will bring its bottom onto the top surfaces of the two work pieces R and S to firmly clamp them to the table top when the lever 50 is actuated. The swivel joint 57 makes the drill guide bottom lie evenly on the surfaces of both pieces and apply equal pressure to them.

With the drill guide 60 locked into position against the two pieces, the user then advances a drill bit through each angled drill guide channel 66. The drill makes the angled pocket hole P in the piece R. The drill preferably is advanced until its end 71 enters the workpiece S to make a screw pilot hole. The drill bit is withdrawn from a channel 66 and a screw (not shown) is then placed in the channel and screwed into the pocket hole P in the piece R and then into piece S. This also is done while the two pieces are clamped together to the table so that proper alignment of the two pieces is maintained. After the two pieces are joined by the screws in the pocket holes, the toggle clamp lever arm 50 is actuates to release the clamp, the drill guide 60 is elevated and the two joined pieces are removed from the table.

As seen, the two pieces to be joined are held together for drilling of the pocket holes and driving of the screws using only the operation of the toggle clamp. In this manner the pocket hole joints are made easily and accurately.

Figure 2:
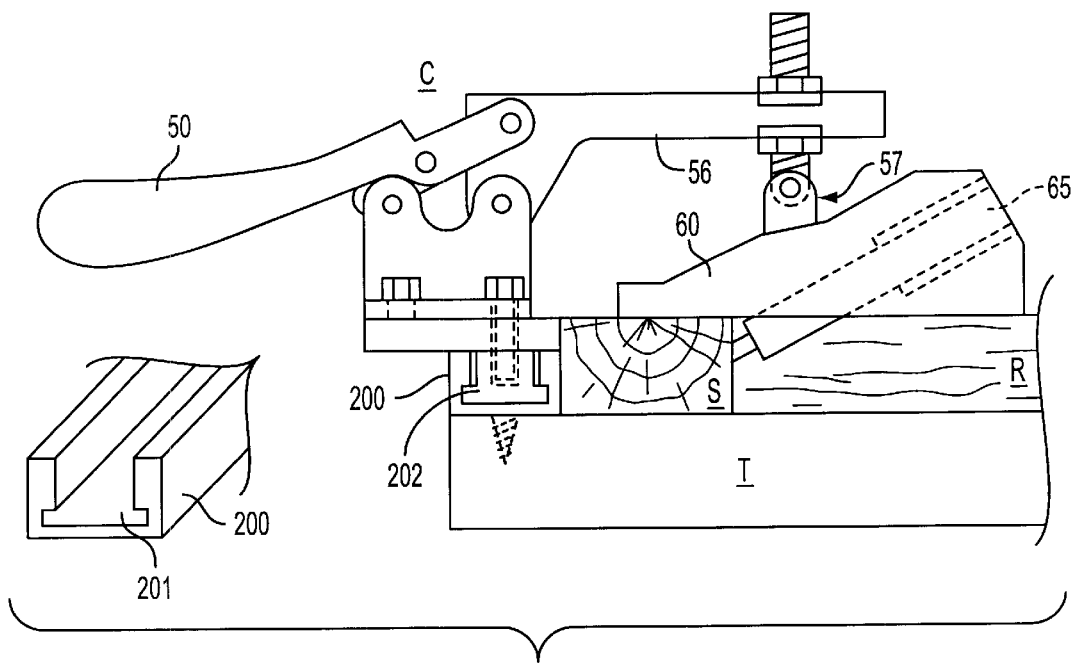
FIG. 2 is a side elevational view of another embodiment of the invention.

FIG. 2 shows another embodiment of the invention that also uses the toggle clamp C. This embodiment is the same as that of FIG. 1 except for the mounting of the fixture and the clamp base 40. Here, instead of using the U clamp base 22 that holds the fixture at one position along the table length, a rail channel 200 having a key slot 201 is screwed onto the table top 12. The rail front edge forms the guide for the work piece S. The clamp base 40 has a post mount 202 of a shape conforming to the rail key slot 201. Thus, the fixture can be moved along the length of the table to position the toggle clamp and drill guide to make the pocket joints at any position along the rail length. For example, a stile piece S can be aligned against the rail 200 and two pieces R spaced along its length can be joined to it by moving the clamp base 40 along the rail and forming the pocket joints in and joining each piece R to the piece S.

While the embodiments previously described use a manually operated toggle clamp, it should be understood that it can also operate with a power driven, such as an air actuated, clamp. Here, the air actuation corresponds to the actuation lever and the clamp has an operating arm that carries the drill guide. As long as the air is supplied, the work pieces are held clamped against the table.

Figure 3:
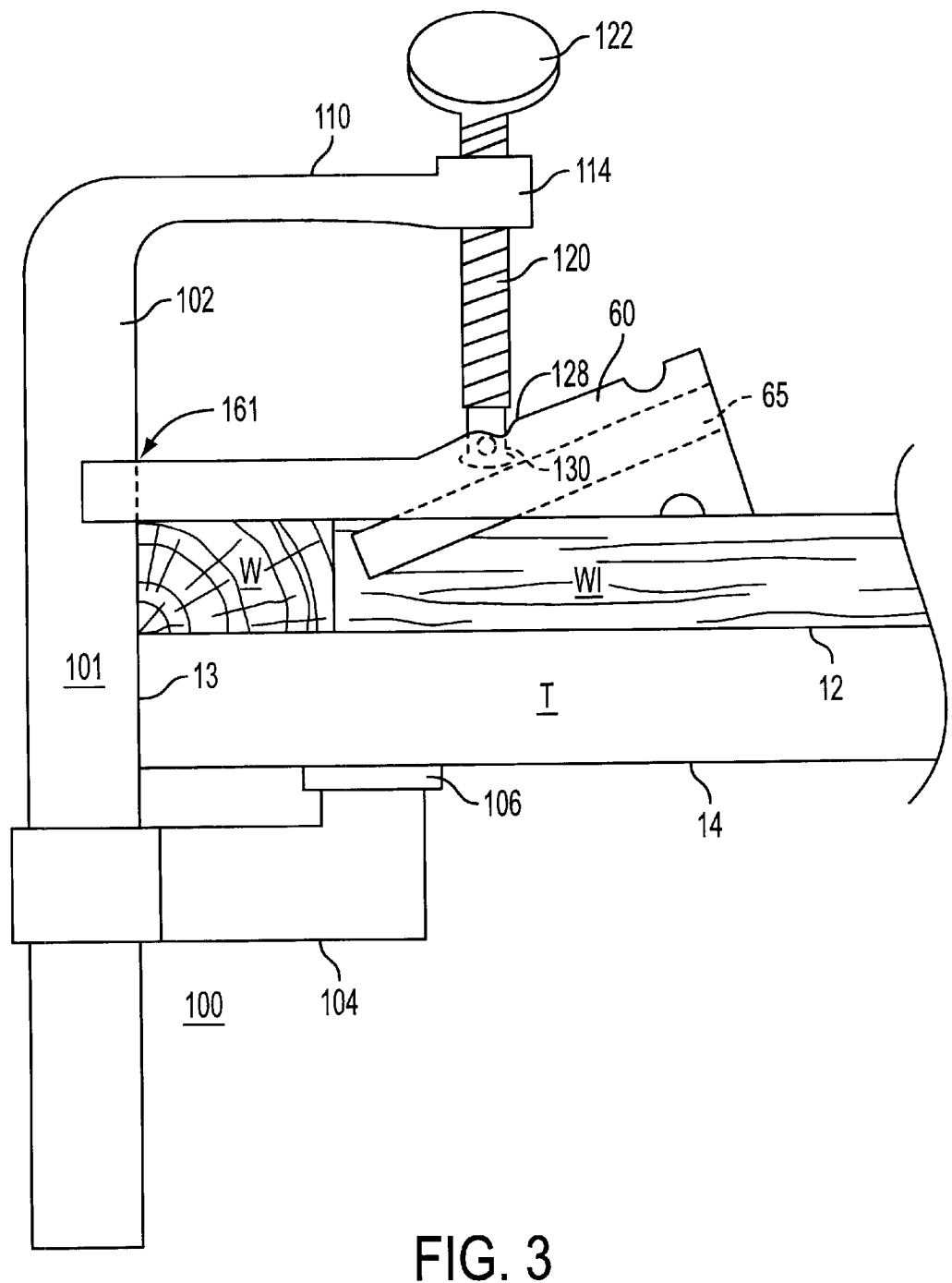
FIG. 3 is an end elevational view of a further embodiment of a fixture in accordance with the invention.

FIG. 3 shows a further embodiment of the invention in which the same reference characters are used for the same elements of FIG. 1. Here, the fixture 100 has a base 101 with a vertical (relative to the table T) clamp arm 102 that has a lower clamp arm 102 affixed transversely thereto. The clamp arm 104 can be of the ratchet locking type, that is, it is adjustable along the length of the bar. Clamp arm 104 has a footing 106 that engages the lower surface 14 of the table. An upper clamp arm 110 is at the upper end of the vertical clamp bar 102 and has a threaded housing 114 at its end which overlies the table.

A screw 120 having a thumb actuator 122 is threaded into the housing 114 and carries the pocket hole drill guide 60 at its lower end. Instead of having the housing 114, the arm 110 can be slotted to have an adjustment mechanism such as 58, 59 of FIGS. 1A and 1B to permit adjustment both vertically and longitudinally of arm 110. The lower end of screw 120 is of a ball or elliptical shape that fits into a socket 130 in the drill guide 60. This forms a universal joint. That is, the joint permits the screw 130 to be rotated and carry the drill guide 60 up or down relative to the work pieces. It also permits the drill guide to swivel along its length so that the guide bottom can rest evenly on and apply even pressure to the surfaces of the abutting pieces S and R. In this embodiment the end 161 of the drill guide 60 preferably is bifurcated to form a slot into which the clamp bar 102 can fit. This stabilizes the drill guide.

In the operation of the fixture of FIG. 3, the work pieces are placed on the table T and generally aligned. The fixture 100 is positioned relative to the table so that the front of the bar 102 engages the table front edge 13. The bar 104 can be flat so that its wider front side can serve as an alignment surface for the workpiece S and it is made as wide as is necessary to assure proper workpiece alignment. The footing 106 of the bottom arm 104 is brought against the lower table surface 14 and the screw 120 is rotated to bring the bottom of the drill guide 60 onto the top surfaces of the work pieces. The work pieces are positioned so that they are properly aligned and there is a final adjustment of screw 130 to firmly fasten the drill guide 60 onto the top surfaces of the work pieces to clamp them to the table. The pocket holes are then drilled and the screws driven in the manner previously described.

The fixtures of the invention are of relatively simple construction but operate efficiently to permit making a pocket hole joints at precise locations and easy joining of two work pieces by the operation of a simple clamp mechanism.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope of the appended claims.

We claim:

1. A fixture for joining two work pieces by pocket hole joints comprising:

a base to be mounted relative to a table top on which the work pieces are to be placed;

a pocket hole drill guide connected to said base having a bottom to be positioned above the top faces of the work pieces, at least one guide channel formed in said drill guide at an inclined angle relative to the table top and having an entrance on one side for a drill bit and an exit on said bottom at a point opposing the top face of one workpiece; and an adjustable clamp means mounted on said base including moving means for moving said drill guide to bring said drill guide bottom into engagement with the top faces of the work pieces to clamp them to the table during the time a drill bit is advanced in said angled guide channel into the one work piece to form a pocket hole.

2. A fixture as in claim 1 wherein said base comprises a member having an alignment piece with a front edge against which the other of the two work pieces is to be positioned for alignment.

3. A fixture as in claim 2 wherein said base is U-shaped with an upper arm, a lower arm and a center arm, said alignment piece being said center arm and said drill guide being connected by said clamp means to said upper arm.

4. A fixture as in claim 3 wherein said clamp means comprises a toggle clamp including a base mounted on or forming a part of said upper arm.

5. A fixture as in claim 4 wherein said toggle clamp comprises an actuating lever mounted to said toggle clamp base, an operating arm connected to and movable vertically as said actuating lever is operated, and wherein said drill guide is mounted on said operating arm to be moved toward and away from the workpiece as said actuating lever is moved.

6. A fixture as in claim 5 further comprising adjustment means to adjust the position of said drill guide both vertically and longitudinally relative to said operating arm.

7. A fixture as in claim 3 further comprising a fixture clamp member mounted in said lower am to engage the bottom of the table and cooperating with said upper arm or clamp base to clamp said base to the table.

8. A fixture as in claim 7 wherein said fixture clamp member is screw threaded and rotatable.

9. A fixture as in claim 4 further comprising a fixture clamp member mounted in said lower arm to engage the bottom of the table and cooperating with said upper arm or clamp base to clamp said base to the table.

10. A fixture as in claim 9 wherein said fixture clamp member is screw threaded and rotatable.

11. A fixture as in claim 3 wherein said base upper arm is to be spaced above the table and work pieces, and said clamp moving means comprises a screw threaded in said upper arm for rotation.

12. A fixture as in claim 11 wherein said base center arm comprises a bar whose long side is to be parallel to the front edge of the table.

13. A fixture as in claim 1 further comprising a rail to be fastened to the table, said rail having a channel and said clamp base having a post mount fitting in said channel to permit movement of base mount along the length of said rail.

14. A fixture as in claim 13 wherein said clamp comprises a toggle clamp mounted on said base and said toggle clamp comprises an actuating lever mounted to said base, an operating arm connected to and movable vertically as said actuating lever is operated, and wherein said drill guide is mounted on said operating arm to be moved toward and away from the workpiece as said actuating lever is moved.

15. A fixture as in claim 14 further comprising adjustment means to adjust the position of said drill guide both vertically and longitudinally relative to said operating arm.

\* \* \* \* \*